Aug. 25, 1942.   T. E. LINDERME   2,293,991
ADJUSTABLE DRILL HEAD
Filed Aug. 11, 1939
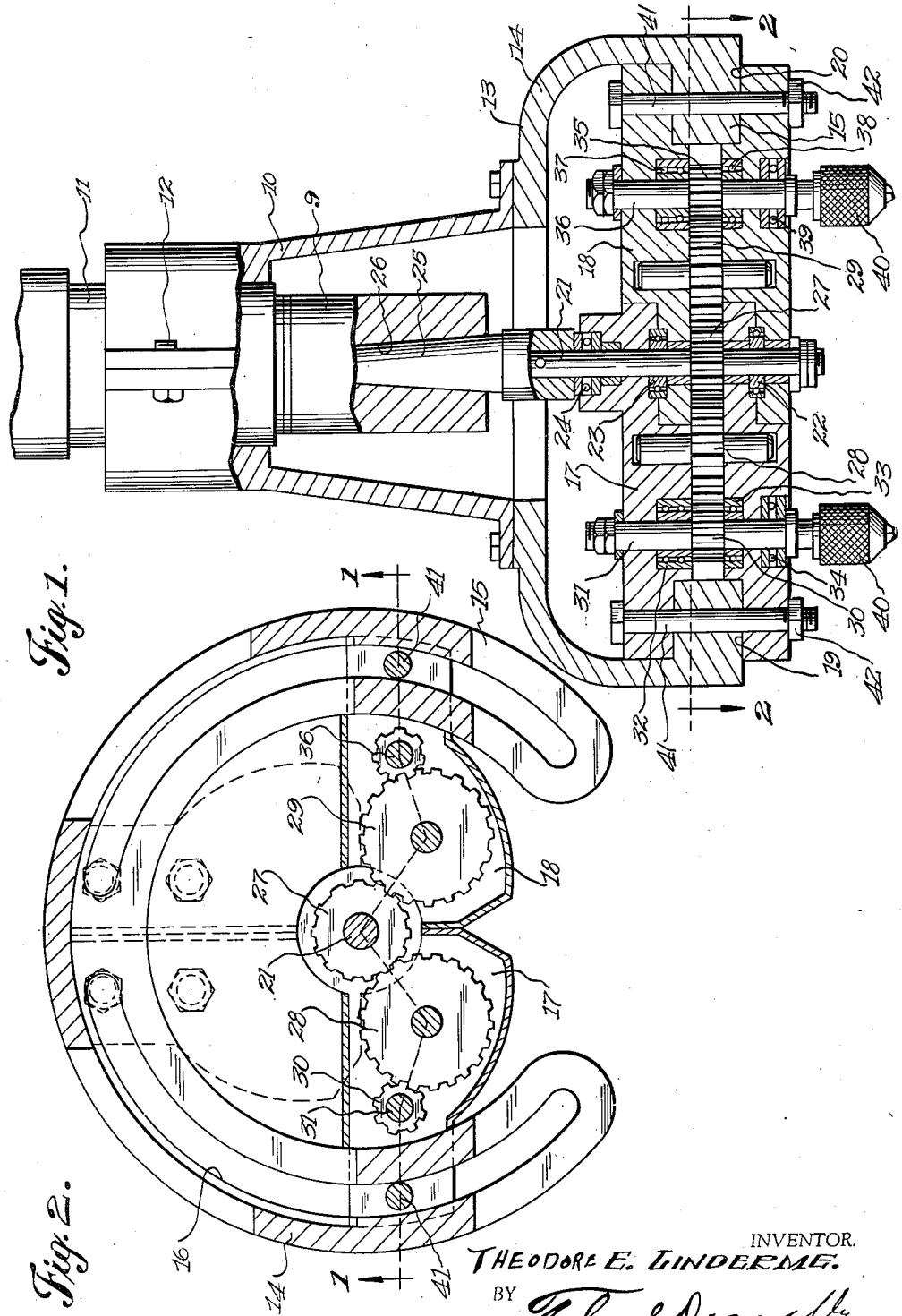
INVENTOR.
THEODORE E. LINDERME.
BY Thos. S. Donnelly
ATTORNEY.

Patented Aug. 25, 1942

2,293,991

UNITED STATES PATENT OFFICE 2,293,991

ADJUSTABLE DRILL HEAD

Theodore E. Linderme, Detroit, Mich.

Application August 11, 1939, Serial No. 289,552

8 Claims. (Cl. 77—24)

My invention relates to a new and useful improvement in an adjustable drill head. While the invention is referred to as a drill head and is adapted for use in connection with drilling operations, it may also be used equally well with other types of operations such as boring, reaming and the like. The drill head carries a plurality of drill receiving shanks which are simultaneously rotated and which may be adjusted to various relative positions. It is the object of the present invention to provide a drill head of this class which will be simple in structure, economical of manufacture, durable, light, compact, possessed of a minimum number of parts and easily and quickly adjusted. Another object of the invention is the provision of a drill head so constructed and arranged that the center of the drill driving mechanism relatively to the quill of the drill machine may be automatically affected upon the mounting of the device of the quill. Another object of the invention is the provision of a drill head of this class so arranged and constructed that the driving mechanism may be easily and quickly removed from the head.

Other objects will appear hereinafter.

The invention consists in the combination and arrangement of parts which are illustrated and described in this specification and in the drawing, of which Fig. 1 is a central, vertical, sectional view of the invention with a part broken away and taken on substantially line 1—1 of Fig. 2.

Fig. 2 is a sectional view taken on substantially line 2—2 of Fig. 1.

The machines with which the invention is used are provided with a driving shank 9 which projects outwardly from the end of a guide sleeve or quill. In the present invention there is provided a sleeve 10 which fits over the quill and which is split so that it may be brought into clamping relation with the quill 11 by means of the bolts 12. This sleeve carries a head 13 projecting outwardly from which are the supporting arms 14 which carry a circular track embodying plate 15 having slots 16 formed therein, the slots being closed at their opposite ends at adjacent ends of the track, the track being circular and formed of a size less than a circle to provide a substantially horseshoe-shaped structure. The driving mechanism comprises a pair of arms 17 and 18 having at their opposite ends channels 19 and 20 respectively in which engage the track. Each of these arms comprises an upper and a lower section. The inner ends of these arms overlap and are pivotly connected together by means of the shaft 21 which is journaled in bearings 22, 23, and 24 secured to the upper end of the shaft 21 and projecting outwardly therefrom is the tapered spindle 25 adapted to engage in the tapered socket 26 formed in the member 9. The construction is such that when the sleeve 10 is bolted into position the spindle 25 will be engaged in the socket 26 in driving relation so that the shaft 21 will rotate with the member 9.

Fixedly mounted on the shaft 21 is a gear 27 meshed with the idler gears 28 and 29, these idler gears being mounted on the arms 17 and 18 respectively. The idler gear 28 meshes with the gear 30 fixedly mounted on the shaft 31 which is journaled in the bearings 32 and 33, and 34, the bearing 34 being a thrust bearing. The idler gear 29 meshes with the gear 35 fixedly mounted on the shaft 36 which is journaled in the bearings 37, 38, and 39. A chuck 40 is carried by each of the shafts 31 and 36 for the reception of a drill reaming tool, boring tool or the like.

The construction is such that when the shaft 21 is rotated the shafts 31 and 36 will likewise be rotated.

Projected through each of the arms 17 and 18 is a lock bolt 41 having nut 42 threaded thereon. When the nuts 42 are threaded into tight relation, the outer ends of the arms 18 and 17 will be clamped in fixed relation to the track, these bolts extending through the slots 16. It will be noted that there is a clearance between the slots 16 and the bolts 41. Since the arms are pivoted at their inner ends on the shaft 21, a loosening of nuts 42 would permit a swinging of the arms 17 and 18 relatively to each other thus effecting a relative movement of the shafts 31 and 36, this movement, of course, varies the distance between the chucks 40 so that the distance between the tools operated by the device may be varied. When these arms have been swung to the desired position so that the space between the drills or other tools used is such as is desired, a tightening of the nuts 42 will secure these parts in fixed relation.

By providing a clearance between the bolts 41 and the slots 16 the driving mechanism has a floating mounting. The sleeve 10 is fixed to the head 14. Frequently the quill or the sleeve from which the member 9 projects may be slightly deformed or may not be truly concentric to the member 19. When such is the case, as the sleeve 10 is shoved upwardly into position onto the quill from the end thereof, the spindle 25 engaging in the socket 26 will shift the driving mechanism to proper position so that the driving mechanism will be properly centered relatively to the driving shaft 9. In order that this may be accomplished it is necessary, of course, that the nuts 42 be loosened. In this manner, the pivotal axis of the arms 18 and 17 will be centered relatively to the member arm. After the adjustment the tightening of the nuts 42 will, of course, secure these arms in fixed rigid position to provide a sturdy rigid mounting for the drive. In this way I have provided an adjustment drill head of the class described in which the various enumerations, as well as others which will be apparent to one skilled in the art, are obtained.

By removing the bolts 41 the arm 17 and 18 may be swung to disengage with the track and the driving mechanism removed from the head. In this way, the facility in repairing is provided.

It is recognized that various changes in the detail of structure set out may be made without departing from the spirit of the present invention and it is my intention that such variations shall be embraced in the claims which are attached hereto.

What I claim as new is:

1. A device of the class described adapted for use with a machine having a stationary part and a rotating member, comprising a head; tubular attachment means carried by said head for attaching to said stationary part; a spindle engageable with and adapted to be driven by said rotating member and extending into and in spaced relation to said tubular attachment means; a rotatable tool-carrying means; means for rotating said tool-carrying means upon rotation of said spindle; and a supporting structure for said spindle, said tool-carrying means, and said rotating means, mounted on and radially movable of said attachment means for effecting the centering of said spindle relatively to said rotating member upon attachment of said head to said stationary part.

2. A device of the class described adapted for use with a machine having a stationary part and a rotating member, comprising a head; tubular attachment means carried by said head for attaching to said stationary part; a spindle engageable with and adapted to be driven by said rotating member and extending into and in spaced relation to said tubular attachment means; a rotatable tool-carrying means; means for rotating said tool-carrying means upon rotation of said spindle; and a supporting structure for said spindle, said tool-carrying means, and said rotating means, mounted on and radially movable of said head for effecting the centering of said spindle relatively to said rotating member upon attachment of said head to said stationary part; and means for securing said structure in fixed relation to said head.

3. In a device of the class described, a head; an arcuate track carried by said head and having elongated spaced apart, arcuate slots formed therein; a pair of arms overlapping at their inner ends; pivot means projected through the inner ends of said arms for swingably connecting said arms together at their inner ends, the outer ends of said arms overlying said track in swingable relation thereto and radially movable thereof; a spindle-forming portion projecting outwardly from said connecting means; a tool-carrying shaft on each of said arms intermediate the ends thereof; and a means effective upon rotation of said spindle-forming portion for rotating said tool-carrying shafts.

4. In a device of the class described, a head; an arcuate track carried by said head and having elongated, spaced apart arcuate slots formed therein; a pair of arms overlapping at their inner ends; pivot means projected through the inner ends of said arms for swingably connecting said arms together at their inner ends, the outer ends of said arms overlying said track in swingable relation thereto and radially movable thereof; a spindle-forming portion projecting outwardly from said connecting means; a tool-carrying shaft on each of said arms intermediate the ends thereof; a means effective upon rotation of said spindle-forming portion for rotating said tool-carrying shafts; and means for locking said arms in fixed relation to said head.

5. In a device of the class described, a supporting head; an arcuate flange projecting inwardly adjacent one end thereof to provide an arcuate track, said track having arcuate slots formed therein; a pair of arms, each of said arms consisting of a pair of sections, said sections at their outer ends, overlying in embracing relation, said track, the inner ends of said arms overlying each other; means for pivotally connecting the inner ends of said arms together; a gear fixedly mounted on said connecting means, and lying between the overlapping ends of said arms; a plurality of gears in each of said arms between the sections thereof and rotatable upon the rotation of said connecting means; a tool-carrying shaft on each of said arms and rotatable upon rotation of said gears; a spindle-forming portion projecting outwardly from and rotatable in unison with said connecting means, said arms, being movable at their outer ends along said track upon swinging upon said connecting means as a center and movable radially of said head within predetermined limits.

6. In a device of the class described, a supporting head; an arcuate flange projecting inwardly adjacent one end thereof to provide an arcuate track, said track having arcuate slots formed therein; a pair of arms, each of said arms consisting of a pair of sections, said sections at their outer ends, overlying in embracing relation, said track, the inner ends of said arms overlying each other; means for pivotally connecting the inner ends of said arms together; a gear fixedly mounted on said connecting means, and lying between the overlapping ends of said arms; a plurality of gears in each of said arms between the sections thereof and rotatable upon the rotation of said connecting means; a tool-carrying shaft on each of said arms and rotatable upon rotation of said gears; a spindle-forming portion projecting outwardly from and rotatable in unison with said connecting means, said arms, being movable at their outer ends along said track upon swinging upon connecting means as a center and movable radially of said head within predetermined limits; and means for securing said arms against movement relatively to said head.

7. A device of the class described adapted for use with a machine having a stationary part and a rotating member concentric with said stationary part and embraced thereby, comprising, a head; attachment means carried by said head and extending outwardly from one side thereof for attachment to said stationary part; a spindle engageable with and adapted to be driven by said rotating part and positioned inwardly from and in spaced relation to said attachment means; rotatable tool carrying means; means for rotating said tool carrying means upon rotation of said spindle; a supporting structure for said spindle, said tool carrying means and said rotating means comprising a pair of arms swingably connected together at their inner ends and provided in their outer faces with a groove; an inwardly projecting flange on said head engaging in said grooves for forming a track for said arms upon relative swinging movement of the same, said supporting structure being radially movable of said head.

8. A device of the class described, adapted for use with a machine having a stationary part and a rotating member concentric with said stationary part and embraced thereby, comprising, a head; attachment means carried by said head and extending outwardly from one side thereof for attachment to said stationary part; a spindle engageable with and adapted to be driven by said rotating part and positioned inwardly from and in spaced relation to said attachment means; rotatable tool carrying means; means for rotating said tool carrying means upon rotation of said spindle; a supporting structure for said spindle, said tool carrying means and said rotating means comprising a pair of arms swingably connected together at their inner ends and provided in their outer faces with a groove; an inwardly projecting flange on said head engaging in said grooves for forming a track for said arms upon relative swinging movement of the same, said supporting structure being radially movable of said head; and means for securing said arms against relative swinging movement and said supporting structure against bodily radial movement relatively to said head.

THEODORE E. LINDERME.